March 25, 1958

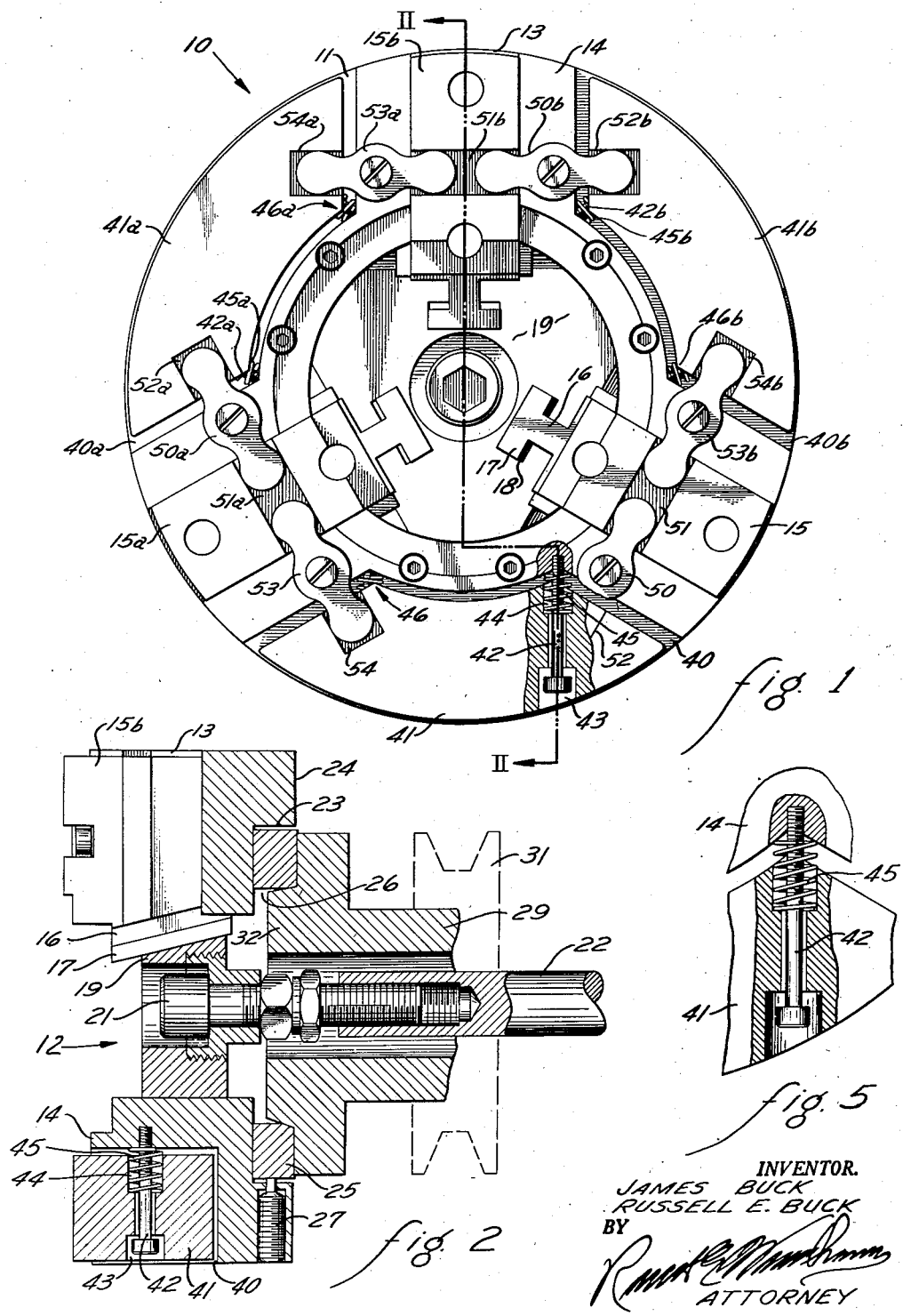

J. R. BUCK ET AL 2,828,134

COUNTER BALANCED CHUCK

Filed Sept. 26, 1955

INVENTORS
JAMES BUCK
RUSSELL E. BUCK
BY

ATTORNEY

United States Patent Office 2,828,134
Patented Mar. 25, 1958

2,828,134

COUNTER BALANCED CHUCK

James R. Buck, Richland Township, Kalamazoo County, and Russell E. Buck, Scotts, Mich., assignors to Buck Tool Company, Kalamazoo, Mich., a corporation of Michigan Application September 26, 1955, Serial No. 536,539

5 Claims. (Cl. 279—119)

This invention relates to an improved chuck construction and more particularly to a counter balanced chuck construction which permits easier closing of the jaws of the chuck while the chuck is rotating at high speeds.

In using a self centering chuck employing radially moving jaws actuated by compressed air or other motive fluid, it is frequently necessary to close the jaws while the chuck is rotating at high speeds, e. g. 2500 R. P. M. To do so requires a compressed air system which supplies air at a relatively high pressure, e. g. 80 p. s. i., because the centrifugal force developed by such high speeds of rotation urges the chuck jaws radially outwardly with great force. In many factories, particularly smaller factories, such a high pressure compressed air system is not available so the operator is unable to close the chuck jaws while rotating at such a high speed and is therefore unable to make full use of the rapid operation possible with a power actuated chuck.

Therefore, it is an object of this invention to provide an improved chuck construction which permits easy closing of the chuck jaws when the chuck is rotating at high speeds.

It is a further object of this invention to provide an improved self centering chuck construction in which a force opposed to centrifugal force operates on the chuck jaws while the chuck is rotating so that the jaws may be moved radially inwardly more easily.

It is a further object of this invention to provide an improved fluid actuated self centering chuck in which a counter balancing weight acts on the chuck jaws in a direction opposite to the centrifugal force when the chuck is rotating.

Other objects and advantages of this invention will become apparent to those acquainted with equipment of this type upon reading the following description and inspecting the accompanying drawings, in which:

Figure 1 is a front elevation view of our improved chuck, partially broken away.

Figure 2 is a sectional view taken along the line II—II of Figure 1.

Figure 5 is an expanded view of a portion of Figure 1 showing the weight in a different position.

General description

Figures 3, 4:
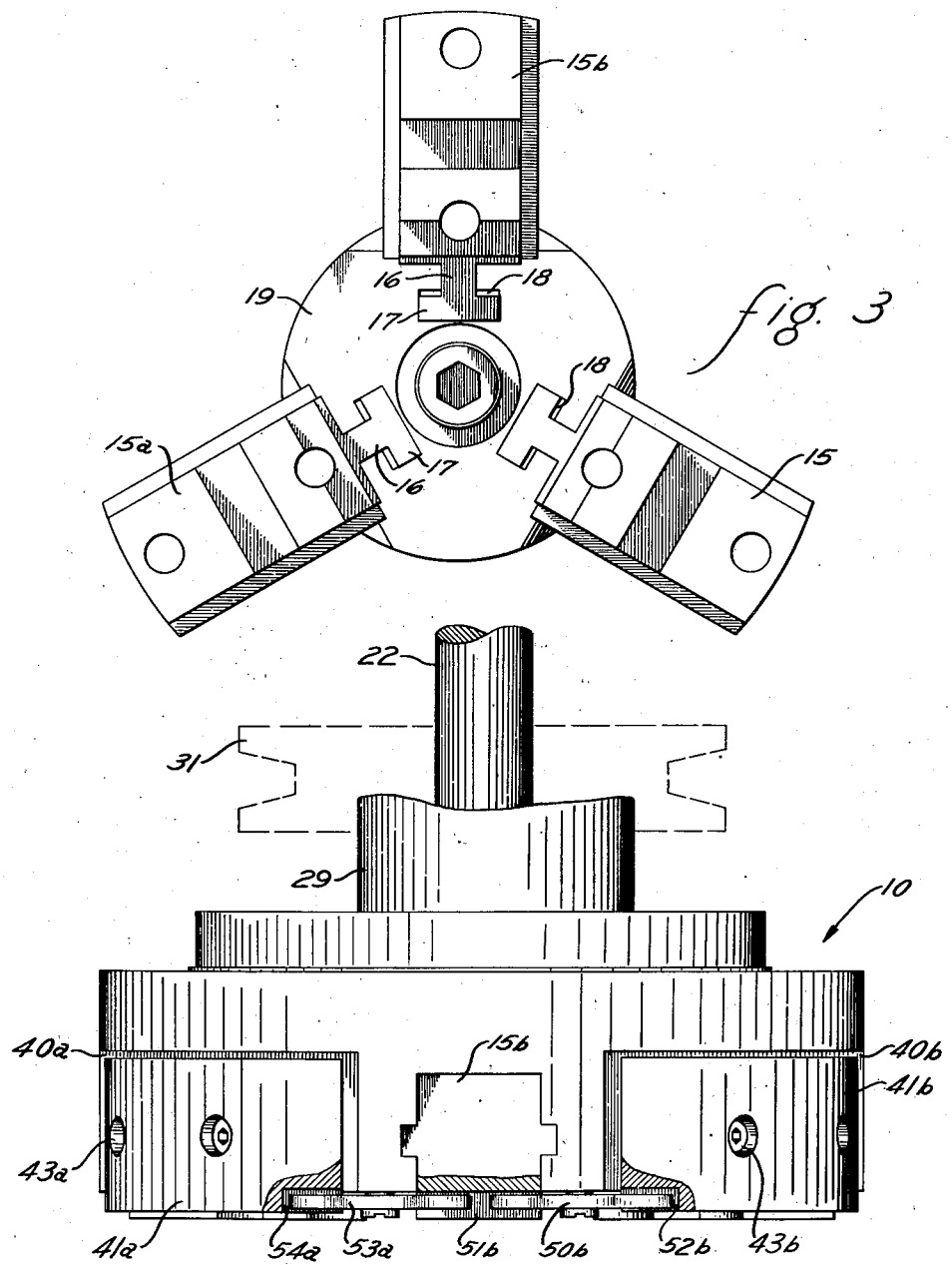
Figure 3 is a front elevation of the wedge member shown in Figure 2 with the clutch jaws associated therewith.
Figure 4 is a top view, partially broken away, of the chuck as appearing in Figure 1.

Our invention provides, in general, a universal chuck 10 employing a plurality of radially moving jaw carriers. Weights 41, 41a and 41b are mounted on the chuck body for movement relative thereof. Levers 50, 50a, 50b, 53, 53a and 53b are connected to weights and to the jaw carriers for exerting a radially inwardly directed force on the jaw carriers when the chuck is rotated.

Detailed description

The universal chuck 10 is of the type generally referred to as a power chuck whose jaws are actuated by fluid pressure. The chuck includes a chuck body 11 which is provided with a plurality, here three, of radially disposed guideways 13 in its jaw or leftward axial face 14 as appearing in Figure 2. The guideways are preferably spaced equi-distantly from each other about said jaw face and communicate with a cylindrical, co-axial bore 12 which extends through the chuck body. Jaw carriers 15, 15a and 15b are radially slidably disposed within each of said guideways 13 in a substantially conventional manner.

The radially inner end of each of the jaw carriers 15, 15a and 15b is provided with a T-shaped tongue 16 (Figure 3), having flanges 17 converging (Figure 2) toward the axis of the chuck 10 on the jaw face side thereof. Each T-shaped tongue is slidably disposable within a corresponding T-shaped slot 18 in the periphery of the substantially cylindrical wedge member 19 which is axially slidably disposed in the body bore 12. Said T-shaped slots 18 cooperate with the T-shaped tongue 16 on each of the jaw carriers 15, 15a and 15b to effect radial movement of said jaws with respect to said chuck in response to axial movement of the wedge member 19 in known manner. Said wedge member is secured, as by a stud 21, to a co-axial draw bar 22, which draw bar is axially reciprocated by conventional means, such as a fluid actuated pressure cylinder, not shown.

A cylindrical, co-axial adapter recess 23, which is a counterbore to the bore 12, is provided in the rear or rightward axial face 24 of the chuck body 11 for loose reception of an adapter ring 25 having a co-axial opening 26 therethrough. Said ring is held within said recess 23 for radial adjustment with respect to the radial wall of said recess by means of a plurality of adjustment screws 27 radially disposed within the chuck body 11 and extendable into the recess 23 through the radial wall thereof.

The chuck 10 may be mounted upon and rotated by a hollow spindle 29 which encircles the draw bar 22 and is driven by any convenient, conventional means, such as means including the pulley 31. The spindle 29 has a cylindrical, or conical, end portion 32 snugly receivable into the adapter ring opening 26, and an annular flange adjacent to said end portion.

The description given thus far is of the power chuck disclosed in our co-pending application, Serial No. 461,203. It is to be understood that the foregoing description is given for illustrative purposes only and that the invention about to be described can be used on power driven chucks which differ in many details from the foregoing structure.

Since the weight and lever constructions are identical, only one of these constructions will be described in detail herein. Corresponding parts in the other weight and lever combinations will be identified with the same reference characters with the suffix "a" or "b" added thereto.

An arcuate recess 40 (Figure 1) is formed in the jaw face of the chuck body 11. An arcuate weight 41 is mounted within the recess for movement relative to the chuck body 11. A bolt 42 is threaded into the chuck body 11 and extends through the weight 41 in the rightward side thereof as appearing in Figure 1. The head of the bolt is loosely received within a recess 43 formed in the weight to allow the weight a limited amount of movement relative thereto. A coil spring 45 is mounted within a recess 44 formed in the radially inner edge of the weight and surrounding the shank of bolt 42 and engages the radially inner edge of recess 40. A second bolt and spring arrangement identical with that previously described is provided in the leftward side of the weight 41 as appearing in Figure 1, to balance the weight and to distribute the load of the weight. The two bolt and spring arrangements are parallel to each other and to the central radial axis of the weight to allow free radial movement thereof.

A first class lever 50 is pivotally mounted on the chuck body 11 between the weight 41 and the jaw carrier 15. One leg of the lever extends into a keyway 51 formed in the carrier 15 while the other leg of lever extends into a recess 52 formed in the front face of the weight 41 adjacent the rightward edge thereof as appearing in Figure 1. A second lever 53 is pivotally secured to the chuck body between weight 41 and jaw carrier 15a with one leg thereof extending into the key 51a in the carrier 15a and the other leg thereof extending into a recess 54 in the front face of weight 41 adjacent the leftward edge thereof.

Operation

The chuck 10 will be rotated by the pulley 31. As it rotates the jaw carriers 15 will be urged outwardly by the centrifugal force. Such force, if not compensated for, increases the force that must be exerted on the wedge 19 to cause the jaws to close. However, in the disclosed construction as the chuck rotates the weights 41, 41a and 41b will be urged radially outwardly due to centrifugal force. Such outward movement acting through the levers 50, 50a, 50b, 53, 53a and 53b will maintain an inwardly directed force on the jaw carriers 15, 15a and 15b. Preferably this force will be chosen by use of a suitable mass for the weights 41, 41a and 41b so that it balances the centrifugal force urging the jaw carriers outwardly. In such case, it will not require a greater force acting on the wedge 19 to close the jaws than is required when the chuck is not rotating or is rotating at a lower speed.

If the chuck is caused to stop rotating and the jaws are moved radially outwardly, e. g. to change the work, the levers will force the weights 41, 41a and 41b radially inwardly against the urging of the springs (Figure 5). The springs, such as spring 45, will be compressed and will prevent the weights from striking the chuck body. During the outward movement of the chuck, the spring 45 will become uncompressed, at least to some extent, and will ride in recess 44. Recess 44 must be sufficiently deep to retain the spring in all positions of the weight. The actual amount of radially outward movement of the weight will depend on a number of factors, such as the speed of rotation of the chuck and the mechanical advantage of the lever and weight construction. The maximum amount of the outward movement of the weights is determined by the spacing between the shoulder of recess 43 and the head of bolt 42.

The jaw carriers 15, 15a and 15b may be the work contacting the jaws of the chuck or auxiliary jaws may be mounted thereon as desired.

Additional weights, in the form of flat plates may, if desired, be secured to weights 41, 41a and 41b in any suitable fashion to increase the mass thereof and modify the chuck for operation at a higher rotational speed than that for which it may have been originally designed.

Although the above mentioned drawings and description apply to one particular, preferred embodiment of the invention it is not our intention, implied or otherwise, to eliminate other variations or modifications which do not depart from the scope of the invention unless specifically stated to the contrary in the hereinafter appended claims.

We claim:

1. A chuck construction, comprising in combination: a chuck body, said chuck body having a plurality of equally spaced, radially directed guideways therein; a jaw carrier movably mounted in each said guideway; a jaw secured to each of said jaw carriers and having a groove formed in its outer, axial surface; a longitudinally movable bar; means connecting said bar to said jaw carriers for moving said carriers along said guideways in response to longitudinal movement of said bar; means in the outer, axial face of said chuck body defining a recess between adjacent guideways, said last-mentioned means also defining surfaces between said recesses and the guideways; a plurality of weights mounted in said recesses for movement radially in response to rotation of said chuck body; means defining a slot at either circumferential end of each weight, said slots being aligned with the groove in the adjacent jaw; resilient means secured to said chuck body and supporting said weights and normally maintaining said weights spaced from said chuck body; a first class lever at either circumferential end of each weight and pivotally mounted on said surface, one end portion of each lever being received in the adjacent slot in the weight and the other end portion of each lever being received into the groove in the adjacent jaw.

2. The chuck construction defined in claim 1, wherein said resilient means for each weight includes a plurality of bolts fixed to said chuck body and extending outwardly therefrom through the weight, and coil springs surround said bolts and are positioned between the chuck body and said weights.

3. A chuck construction, comprising in combination: a chuck body, said chuck body having a plurality of spaced, radially directed guideways therein; a jaw carrier movably mounted in each said guideway; means for moving said jaw carriers along said guideways; a jaw secured to each of said jaw carriers and extending through the outer axial face of said chuck body; means in the outer axial face of said chuck body defining a recess between adjacent guideways; a weight mounted in each of said recesses for movement radially in response to rotation of said chuck body; resilient means secured to said chuck body and supporting said weights and normally maintaining said weights spaced from said chuck body; lever means pivotally mounted on the outer axial face of said chuck body, said lever means connecting said weights to said jaws whereby said jaws are urged inwardly by said weights upon rotation of said chuck.

4. A chuck construction, comprising in combination: a chuck body, said chuck body having a plurality of spaced, radially directed guideways therein; a jaw carrier movably mounted in each guideway; a longitudinally movable bar and means connecting said bar to said jaw carriers for moving said carriers along said guideways in response to longitudinal movement of said bar, said last named means being located internally of said chuck body and substantially coaxial therewith; a jaw mounted on each jaw carrier and extending through the outer axial face of said chuck body; a weight located between adjacent guideways in front of the outer axial face of said chuck body and resilient means secured to said chuck body and supporting said weights for radial movement and normally maintaining said weights spaced from said chuck body; lever means pivotally mounted on the chuck body and positioned in front of the outer axial face of said chuck body, said lever means connecting said weights to said jaws whereby said jaws are urged inwardly by said weights upon rotation of said chuck.

5. A chuck construction, comprising in combination: a chuck body, said chuck body having a plurality of equally spaced, radially directed guideways therein; a jaw carrier movably mounted in each said guideway and having a jaw mounted thereon; a longitudinally movable bar and means connecting said bar to said jaw carriers for moving said carriers along said guideways in response to longitudinal movement of said bar; a plurality of weights mounted on said chuck body for movement radially in response to rotation of said chuck body; resilient means supporting said body and normally maintaining said weights spaced from said chuck body, said weights being mounted intermediate said guideways; a pair of first class levers pivotally mounted on said chuck body adjacent each of said guideways, said pair of levers being respectively positioned on either side of their associated guideway and each lever having one end portion thereof connected to the jaw in said associated guideway, said levers having the other end portions thereof connected, respectively, to the weights on either side of said guideway, each of said weights having the end portions of two levers connected thereto, said two levers being associated with adjacent guideways.

References Cited in the file of this patent

UNITED STATES PATENTS

| | | |
|---|---|---|
| 2,207,621 | Hite | July 9, 1940 |
| 2,367,863 | Grey | Jan. 23, 1945 |
| 2,471,038 | Luginbuhl | May 24, 1949 |
| 2,697,612 | Sloan | Dec. 21, 1954 |